US011097316B2

United States Patent
Ohkawa et al.

(10) Patent No.: US 11,097,316 B2
(45) Date of Patent: Aug. 24, 2021

(54) SORTING SYSTEM, RECOGNITION SUPPORT APPARATUS, RECOGNITION SUPPORT METHOD, AND RECOGNITION SUPPORT PROGRAM

(71) Applicants: Kabushiki Kaisha Toshiba, Minato-ku (JP); Toshiba Infrastructure Systems & Solutions Corporation, Kawasaki (JP)

(72) Inventors: Yasuhiro Ohkawa, Kawasaki (JP); Tomoyuki Hamamura, Shinagawa (JP); Takuma Akagi, Meguro (JP)

(73) Assignees: Kabushiki Kaisha Toshiba, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 170 days.

(21) Appl. No.: 15/861,940

(22) Filed: Jan. 4, 2018

(65) Prior Publication Data
US 2018/0200760 A1 Jul. 19, 2018

(30) Foreign Application Priority Data
Jan. 13, 2017 (JP) .............................. JP2017-004205

(51) Int. Cl.
*B07C 3/14* (2006.01)
*G06K 9/18* (2006.01)
(Continued)

(52) U.S. Cl.
CPC ............ *B07C 3/14* (2013.01); *G06K 9/00463* (2013.01); *G06K 9/00469* (2013.01);
(Continued)

(58) Field of Classification Search
CPC .......... G06K 9/00463; G06K 9/00469; G06K 9/033; G06K 9/18; G06K 9/4628;
(Continued)

(56) References Cited

U.S. PATENT DOCUMENTS 6,327,373 B1 * 12/2001 Yura ...................... G06K 9/723
382/101
9,275,169 B2 * 3/2016 Bonnet ................. G06F 40/237
(Continued)

FOREIGN PATENT DOCUMENTS

| JP | 2008-33851 A | 2/2008 |
| JP | 2013-198886 | 10/2013 |
| JP | 2015-167905 A | 9/2015 |

OTHER PUBLICATIONS

Hamamura et al. "An a posteriori probability calculation method for analytic word recognition applicable to address recognition." 2009 10th International Conference on Document Analysis and Recognition. IEEE, 2009. (Year: 2009).*
(Continued)

*Primary Examiner* — Katrina R Fujita
(74) *Attorney, Agent, or Firm* — Oblon, McClelland, Maier & Neustadt, L.L.P.

(57) ABSTRACT

According to one embodiment, a sorting system has a delivery processing apparatus, a video coding terminal, and a recognition support apparatus. The recognition support apparatus has an information management portion, a correct solution derivation portion, and a machine learning portion. The information management portion acquires an image obtained by imaging a delivery object and keying information. The correct solution derivation portion derives respective correct solutions for a plurality of processings for the image obtained by imaging the delivery object, based on the keying information acquired by the information management portion. The machine learning portion performs
(Continued)

machine learning using the respective correct solutions for the plurality of processings derived by the correct solution derivation portion, to adjust the plurality of processings.

6 Claims, 10 Drawing Sheets

(51) Int. Cl.
  *G06K 9/00* (2006.01)
  *G06K 9/66* (2006.01)
  *G06K 9/03* (2006.01)
  *G06K 9/46* (2006.01)
  *G06N 20/00* (2019.01)

(52) U.S. Cl.
  CPC .............. *G06K 9/033* (2013.01); *G06K 9/18* (2013.01); *G06K 9/66* (2013.01); *B07C 2301/0066* (2013.01); *G06K 9/4628* (2013.01); *G06K 2209/01* (2013.01); *G06N 20/00* (2019.01)

(58) Field of Classification Search
  CPC ........ G06K 9/66; G06K 2209/01; B07C 3/14; B07C 2301/066; G06N 20/00
  See application file for complete search history.

(56) References Cited

U.S. PATENT DOCUMENTS

| | | | |
|---|---|---|---|
| 2005/0100209 A1* | 5/2005 | Lewis | G06K 9/6262 382/159 |
| 2006/0050969 A1* | 3/2006 | Shilman | G06F 40/171 382/224 |
| 2006/0245641 A1* | 11/2006 | Viola | G06F 40/295 382/155 |
| 2008/0273749 A1 | 11/2008 | Rundle et al. | |
| 2011/0078191 A1* | 3/2011 | Ragnet | G06K 9/00879 707/780 |
| 2012/0072013 A1 | 3/2012 | Hamamura et al. | |
| 2015/0306634 A1 | 10/2015 | Maeda et al. | |
| 2016/0188783 A1* | 6/2016 | Li | G06F 17/50 716/112 |
| 2017/0286803 A1* | 10/2017 | Singh | G06K 9/6212 |
| 2018/0247221 A1* | 8/2018 | Park | G06F 40/20 |

OTHER PUBLICATIONS

Hamamura et al. "Bayesian Best-First Search for Pattern Recognition—Application to Address Recognition." 2009 10th International Conference on Document Analysis and Recognition. IEEE, 2009. (Year: 2009).*

Extended European Search Report dated Jun. 5, 2018 in corresponding European Patent Application No. 17208737.1 citing documents AA, AB, AC and AO therein, 9 pages.

* cited by examiner

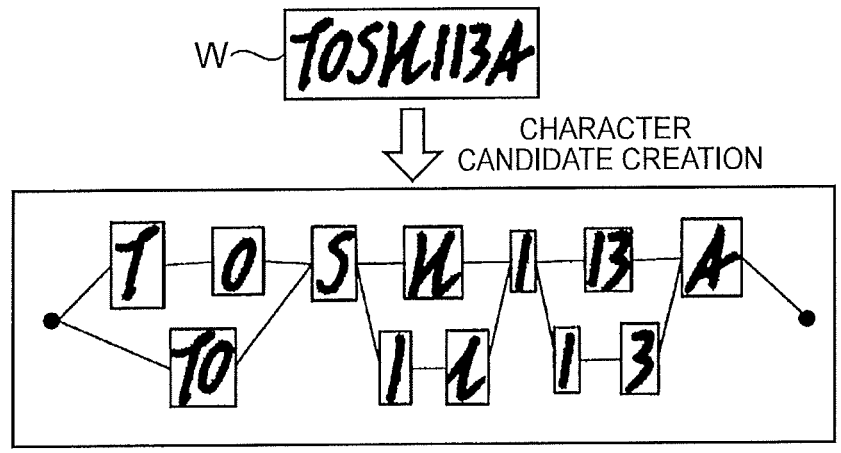
FIG. 13
| WORD LIST | SCORE |
|---|---|
| TOKYO | 91 |
| TO5121134 | 150 |
| KYOTO | 76 |
| TOSHIBA | 149 |
| KOBE | 43 |
| : | : |
FIG. 14
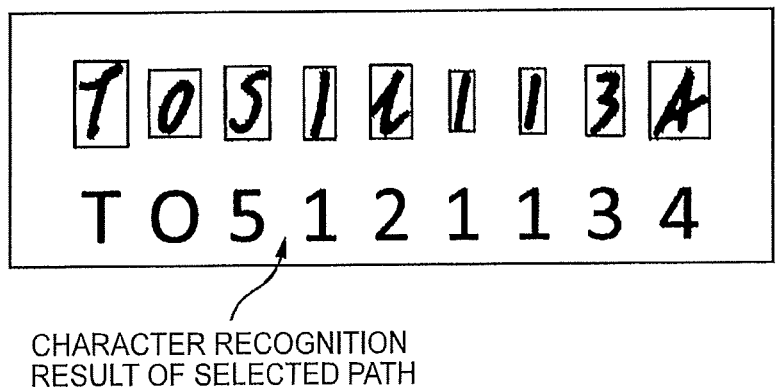
CHARACTER RECOGNITION
RESULT OF SELECTED PATH
FIG. 15

SORTING SYSTEM, RECOGNITION SUPPORT APPARATUS, RECOGNITION SUPPORT METHOD, AND RECOGNITION SUPPORT PROGRAM

CROSS-REFERENCE TO RELATED APPLICATION

This application is based upon and claims the benefit of priority from the prior Japanese Patent Application No. 2017-004205, filed on Jan. 13, 2017; the entire contents of which are incorporated herein by reference.

FIELD

Embodiments described herein relate generally to a sorting system, a recognition support apparatus, a recognition support method, and a recognition support program.

BACKGROUND

In a post office, a distribution center and so on, a processing for automatically recognizing an address has been performed by an OCR (Optical Character Recognition) processing for an image obtained by imaging a delivery object (S). This OCR processing performs a plurality of processings step by step or while performing feedback, but it has been difficult to obtain a correct solution for each of a plurality of the processings, and accordingly it has been difficult to automatically adjust a parameter, a procedure, a rule and so on for each processing.

BRIEF DESCRIPTION OF THE DRAWINGS

FIG. 13 is a diagram showing an aspect in which a processing result that is not a correct solution is obtained by fluctuation of the processing result of each stage by the recognition execution portion 120 (the OCR processing portion 25);

FIG. 14 is a diagram showing an aspect in which a processing result that is not a correct solution is obtained by fluctuation of the processing result of each stage by the recognition execution portion 120 (the OCR processing portion 25);

FIG. 15 is a diagram showing an aspect in which a wrong word is recognized as a correct solution;

DETAILED DESCRIPTION

According to one embodiment, a sorting system has a delivery processing apparatus, a video coding terminal, and a recognition support apparatus. The delivery processing apparatus performs an OCR processing including a plurality of processings for an image obtained by imaging a delivery object (S), and conveys the delivery object (S) to a stacking portion corresponding to information read by the OCR processing. The video coding terminal receives the image obtained by imaging the delivery object (S) from the delivery processing apparatus, displays the received image, and transmits keying information inputted to the image obtained by imaging the delivery object to the delivery processing apparatus. The recognition support apparatus has an information management portion, a correct solution derivation portion, and a machine learning portion. The information management portion acquires the image obtained by imaging the delivery object (S) and the keying information. The correct solution derivation portion derives respective correct solutions for the plurality of processings for the image obtained by imaging the delivery object (S), based on the keying information acquired by the information management portion. The machine learning portion performs machine learning using the respective correct solutions for the plurality of processing derived by the correct solution derivation portion, to adjust the plurality of processings.

Hereinafter, a sorting system, a recognition support apparatus, a recognition support method, and a recognition support program according to embodiments will be described with reference to the drawings.

Figure 1:
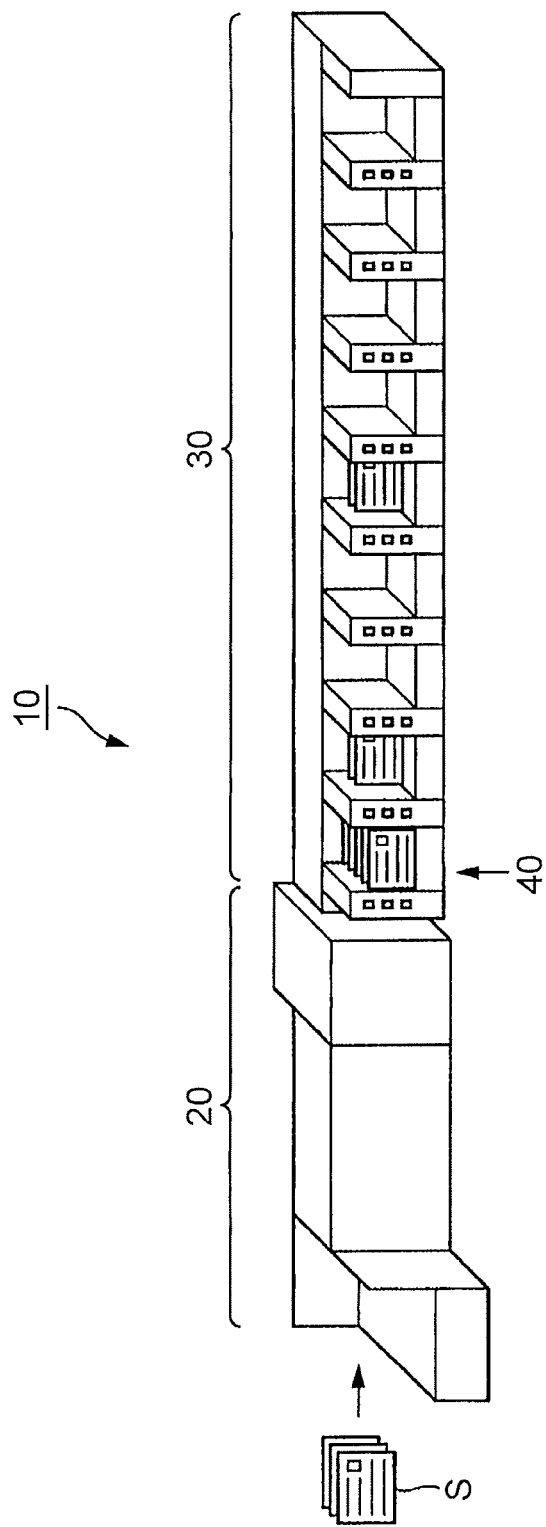
FIG. 1 is a diagram showing an outline of a configuration of a delivery processing apparatus 10 included in a sorting system 1 according to an embodiment.

FIG. 1 is a diagram showing an outline of a configuration of a delivery processing apparatus 10 included in a sorting system 1 according to an embodiment. The delivery processing apparatus 10 is a mail processing and sorting machine to be installed in a post office or the like, for example, or a baggage/parcel processing and sorting machine to be installed in a distribution center or the like, for example, (in the drawing, the mail processing and sorting machine is shown). The delivery processing apparatus 10 is an apparatus which recognizes a destination that is written or pasted on a delivery object S such as a postcard, a sealed letter, a parcel, a baggage, and sorts and stacks the delivery object S into a stacker corresponding to the destination.

The delivery processing apparatus 10 is provided with a sorting preprocessing portion 20, and a sorting portion 30, for example. A plurality of stackers (stacking portion) 40 are provided in the sorting portion 30.

Figure 2:
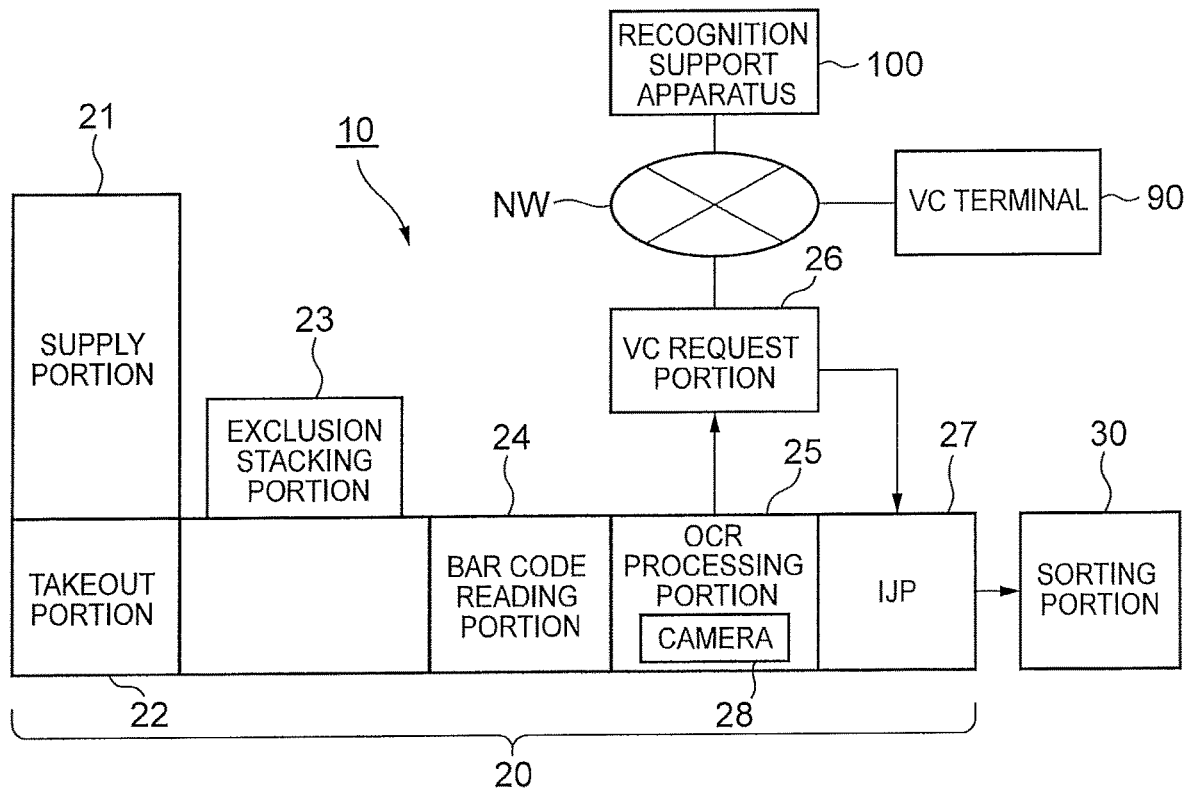
FIG. 2 is a configuration diagram of the sorting system 1.

FIG. 2 is a configuration diagram of the sorting system 1. In the sorting system 1, the delivery processing apparatus 10, a VC (Video Coding) terminal 90, and a recognition support apparatus 100 are connected via a network NW. The network NW is a LAN (Local Area Network), a WAN (Wide Area Network) or the like, for example. In addition, the function of the recognition support apparatus 100 may be integrated in the delivery processing apparatus 10.

The description will be made from the delivery processing apparatus 10 in order. The sorting preprocessing portion 20 of the delivery processing apparatus 10 is provided with a supply portion 21, a takeout portion 22, an exclusion stacking portion 23, a bar code reading portion 24, an OCR (Optical Character Recognition) processing portion 25, a VC request portion 26, and an IJP (Ink Jet Printer) 27, for example.

In the supply portion 21, a plurality of delivery objects S are manually set by an operator, for example. The takeout portion 22 takes out the delivery objects S set in the supply portion 21 one by one, and supplies the taken-out delivery object S to a conveying path. In this conveying path, the delivery object S in which a foreign matter is mixed or the delivery object S of a non-standard size is excluded, and is stacked in the exclusion stacking portion 23.

The bar code reading portion 24 reads the bar code from the delivery object S on which a stealth bar code has already been printed, decodes information which has been encoded in the stealth bar code, and outputs the information to a control portion. The delivery object S printed with the stealth bar code at this time point is the delivery object S from which identification information has been read by a VC processing described later, but which has not been conveyed to the stacker corresponding to its sorting destination.

The OCR processing portion 25 performs an OCR processing for an image (hereinafter, an imaged image) that has been imaged by a camera 28 for imaging the delivery object S, to read information such as a postal code, a destination, and a sender of the delivery object S. The camera 28 is a line camera, for example. In addition, a part of the OCR processing (a character recognition portion other than a postal code, for example) may be subjected to a distributed processing by another computer connected via the network NW. A processor such as a CPU (Central Processing Unit) and a GPU (Graphics Processing Unit) executes a program, and thereby the OCR processing portion 25 is realized.

The VC request portion 26 transmits the imaged image of the delivery object S from which a part or all of the information have not been read by the OCR processing portion 25 to the VC terminal 90 via the network NW, and receives information (the postal code and the destination, for example) relating to the delivery object S from the VC terminal 90. Hereinafter, the information to be received from the VC terminal 90 is referred to as keying information. The VC terminal 90 displays the imaged image received from the delivery processing apparatus 10 to an operator, and sends back the information inputted by the operator to the delivery processing apparatus 10. This processing to display the imaged image and accept the input is referred to as a VC processing. In addition, in the present embodiment, the delivery object S which has been recognizable may be transmitted daringly to the VC terminal 90, to obtain the keying information.

The IJP 27 prints an object in which the information of the delivery object S acquired by the OCR processing portion 25 or the VC request portion 26 has been encoded on the delivery object S, as a stealth bar code. This stealth bar code is read by the bar code reading portion 24 attached to the IJP 27, and is subjected to a verify processing.

Figure 3:
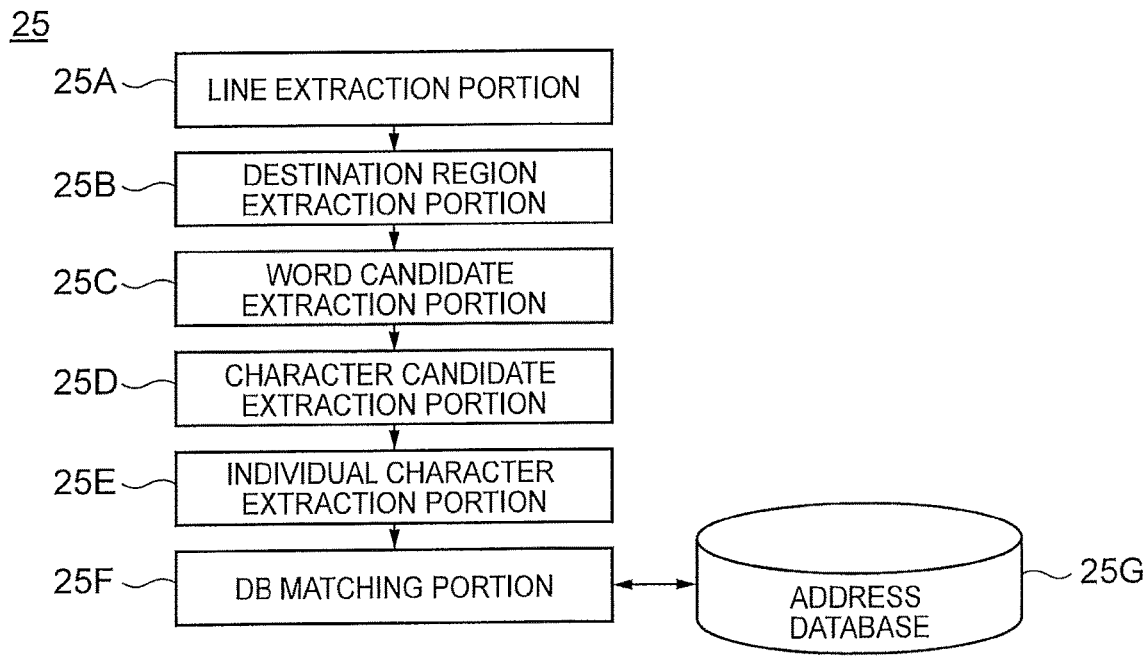
FIG. 3 is a functional configuration diagram of the OCR processing portion 25.

FIG. 3 is a functional configuration diagram of the OCR processing portion 25. In the OCR processing portion 25, a plurality of functional portions described below perform different processings sequentially or while performing feedback to each other, and thereby the OCR processing portion 25 executes a plurality of processings. The OCR processing portion 25 is provided with a line extraction portion 25A, a destination region extraction portion 25B, a word candidate extraction portion 25C, a character candidate extraction portion 25D, an individual character recognition portion 25E, and a DB matching portion 25F, for example. In addition, a set of these functional portions is just one example, and the functional portions may be integrated, added or changed. In addition, the OCR processing portion 25 performs a processing with reference to an address database 25G. The address database 25G is incorporated in the delivery processing apparatus 10, or is stored in a storage device (not shown) which is accessible via the network NW.

Figure 4:
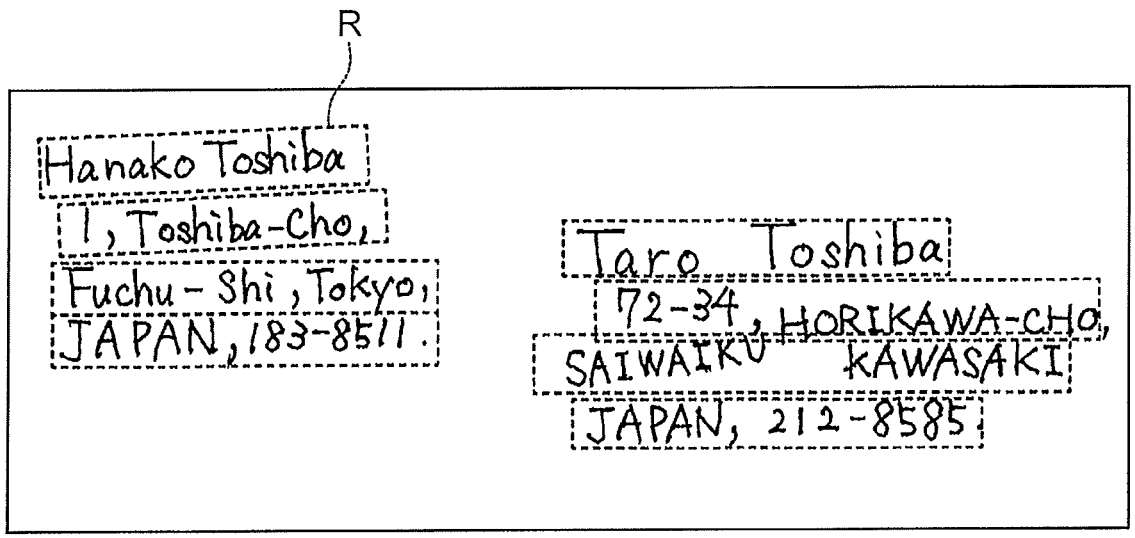
FIG. 4 is a diagram showing contents of a processing by the line extraction portion 25A.
Figure 5:
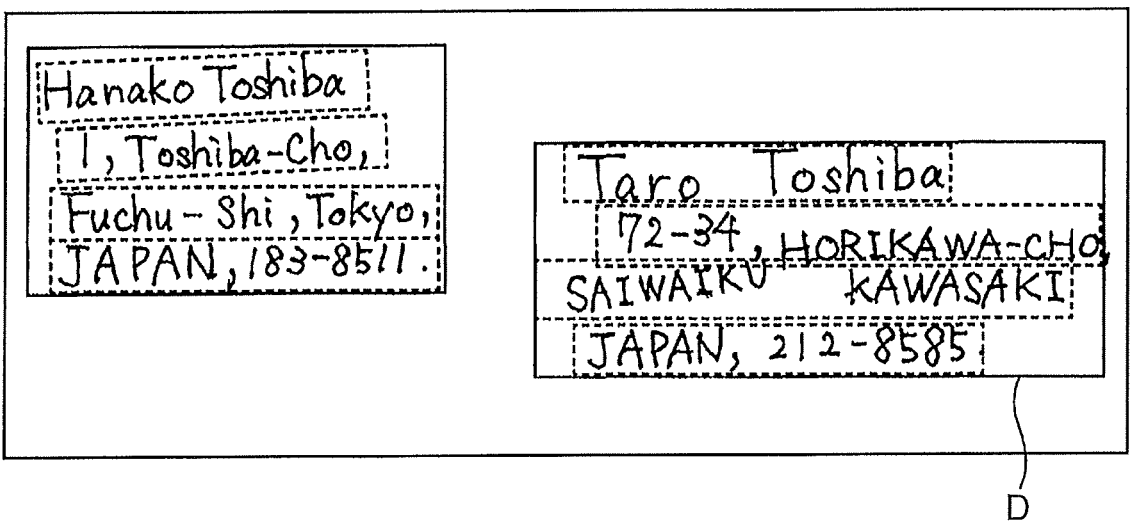
FIG. 5 is a diagram showing contents of a processing by the destination region extraction portion 25B.

The line extraction portion 25A extracts a line which becomes an address recognition object from the imaged image. FIG. 4 is a diagram showing contents of a processing by the line extraction portion 25A. As shown in the drawing, the line extraction portion 25A extracts a region which includes a group of images that are estimated to be characters, and has heights and lengths within certain degree of ranges from the imaged image IM, as a line R. The destination region extraction portion 25B extracts a region including a plurality of the lines R as a destination region. FIG. 5 is a diagram showing contents of a processing by the destination region extraction portion 25B. As shown in the drawing, the destination region extraction portion 25B extracts, out of the lines R extracted by the line extraction portion 25A, a region including the lines R in which a destination is estimated to be written, as a destination region D.

Here, there may arise a case in which the destination region D is not uniquely determined, as shown in FIG. 5. The OCR processing portion 25 does not forcefully obtain one solution in the processing of each stage, but proceeds the processing while leaving possible options. Accordingly, as described below, the recognition result to be given to the DB matching portion 25F come to be divided into a plurality of patterns by branching.

Figure 6:
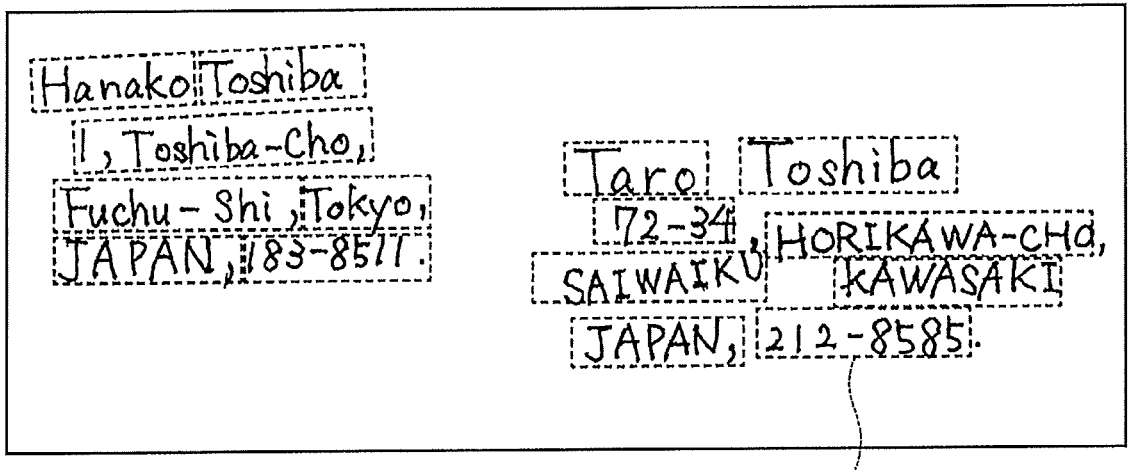
FIG. 6 is a diagram showing contents of a processing by the word candidate extraction portion 25C.

The word candidate extraction portion 25C extracts one or more word candidates from each of the lines R included in the destination region D. FIG. 6 is a diagram showing contents of a processing by the word candidate extraction portion 25C. As shown in the drawing, the word candidate extraction portion 25C extracts a region which is estimated to be a group of characters or symbols (including a numeric character) having a certain meaning, as a word candidate W.

Figure 7:
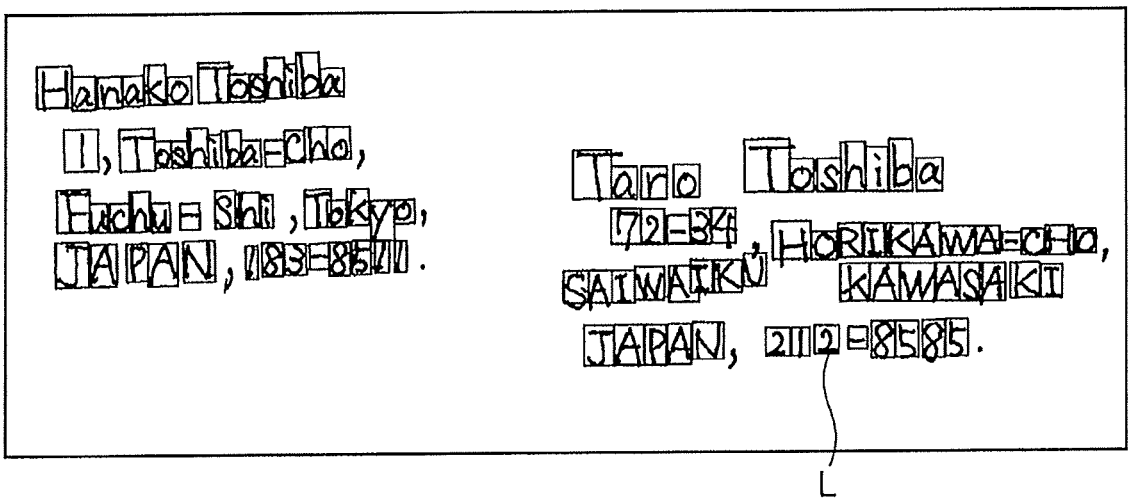
FIG. 7 is a diagram showing contents of a processing by the character candidate extraction portion 25D.

The character candidate extraction portion 25D extracts individual character candidates included in the word candidate W extracted by the word candidate extraction portion 25C. FIG. 7 is a diagram showing contents of a processing by the character candidate extraction portion 25D. As shown in the drawing, the character candidate extraction portion 25D extracts a region that is estimated to be one character or one symbol, as a character candidate L.

Figure 8:
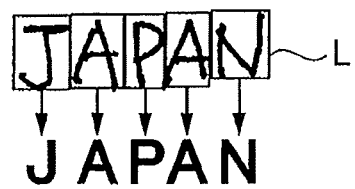
FIG. 8 is a diagram showing contents of a processing by the individual character recognition portion 25E.

The individual character recognition portion 25E determines, regarding each of the character candidates extracted by the character candidate extraction portion 25D, to which one of the characters or the symbols that have been previously registered the each character candidate correspond, to thereby perform individual character recognition. FIG. 8 is a diagram showing contents of a processing by the individual character recognition portion 25E. As shown in the drawing, the individual character recognition portion 25E performs individual character recognition for each of the character candidates L.

The DB matching portion 25F compares a series of the characters or the symbols (the character string) that is the result of the processing by the individual character recognition portion 25E with the addresses stored in the address database 25G, and determines an address having the highest matching ratio (score) with the result of the processing by the individual character recognition portion 25E, out of the addresses stored in the address database 25G, as a destination of the delivery object S.

Figure 9:
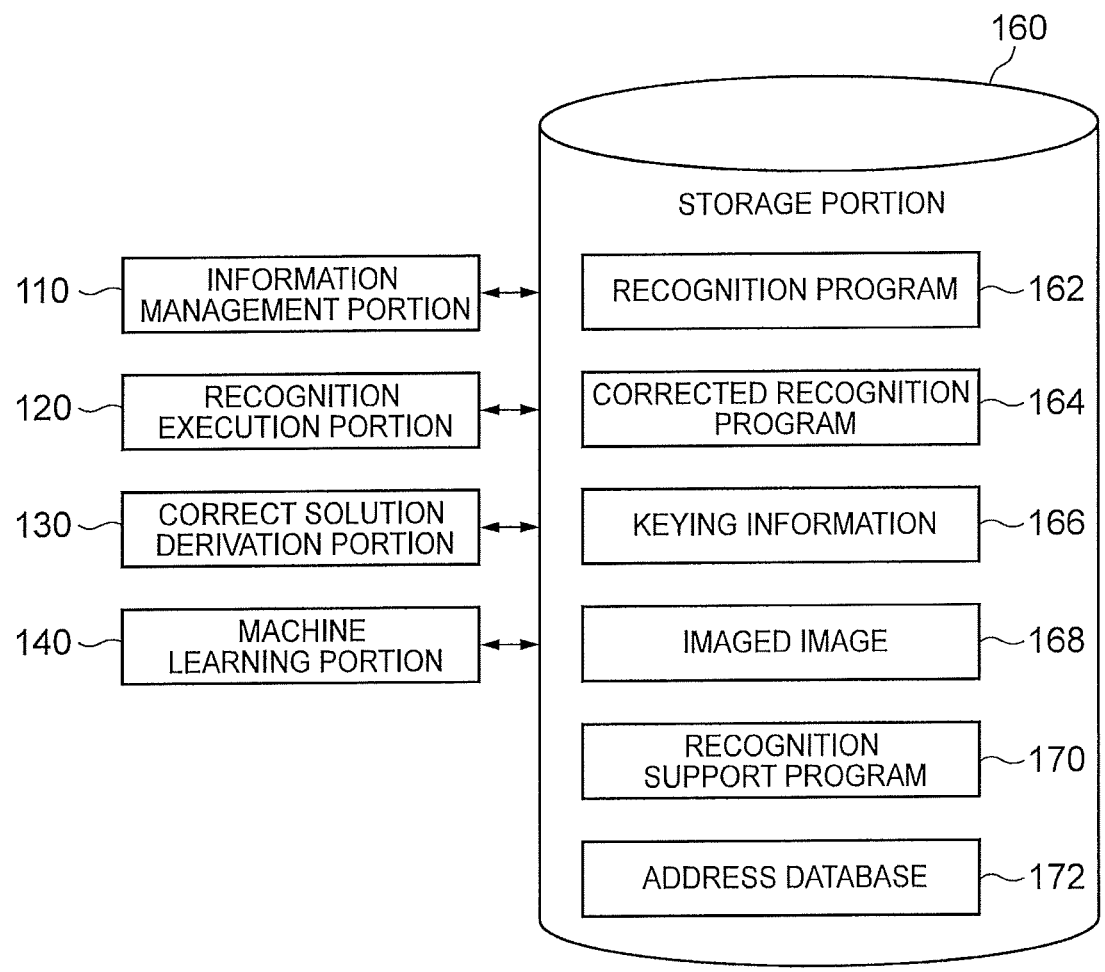
FIG. 9 is a functional configuration diagram of the recognition support apparatus 100.

FIG. 9 is a functional configuration diagram of the recognition support apparatus 100. The recognition support apparatus 100 is provided with an information management portion 110, a recognition execution portion 120, a correct solution derivation portion 130, a machine learning portion 140, and a storage portion 160. A processor such as a CPU and a GPU executes a recognition support program 170, for example, and thereby the information management portion 110, the recognition execution portion 120, the correct solution derivation portion 130, and the machine learning portion 140 are realized. And a part or all of these functional portions may be realized by a hardware such as an LSI (Large Scale Integration), an ASIC (Application Specific Integrated Circuit), and an FPGA (Field-Programmable Gate Array), or may be realized by cooperation of hardware and software.

The storage portion 160 is realized by a storage device such as a RAM (Random Access Memory), a ROM (Read Only Memory), an HDD (Hard Disk Drive), and a flash memory, for example. In the storage portion 160, information such as a recognition program 162, a corrected recognition program 164, keying information 166, an imaged image 168, a recognition support program 170, and an address database 172 is stored. The address database 172 is the same one as the address database 25G.

The information management portion 110 has both of a network interface such as an NIC (Network Interface Card) and a software functional portion. The information management portion 110 has following functions. (1) The information management portion 110 acquires a recognition program (a program for realizing the respective functional portions of the OCR processing portion 25G of the delivery processing apparatus 10) during operation from the delivery processing apparatus 10, and stores it in the storage portion 160 as the recognition program 162. (2) The information management portion 110 reads the corrected recognition program 164 that has been generated by the machine learning portion 140 from the storage portion 160, and transmits it to the delivery processing apparatus 10. (3) The information management portion 110 acquires the keying information and the imaged image from the VC terminal 90 as a set, and stores them respectively in the storage portion 160 as parts of the keying information 166 and the imaged image 168. Identification information indicating the corresponding relation with the imaged image shall be given to each of the keying information included in the keying information 166.

The recognition execution portion 120 operates based on the recognition program 162, and performs the same processing for the imaged image 168 as the OCR processing portion 25 of the delivery processing apparatus 10.

Figure 10:
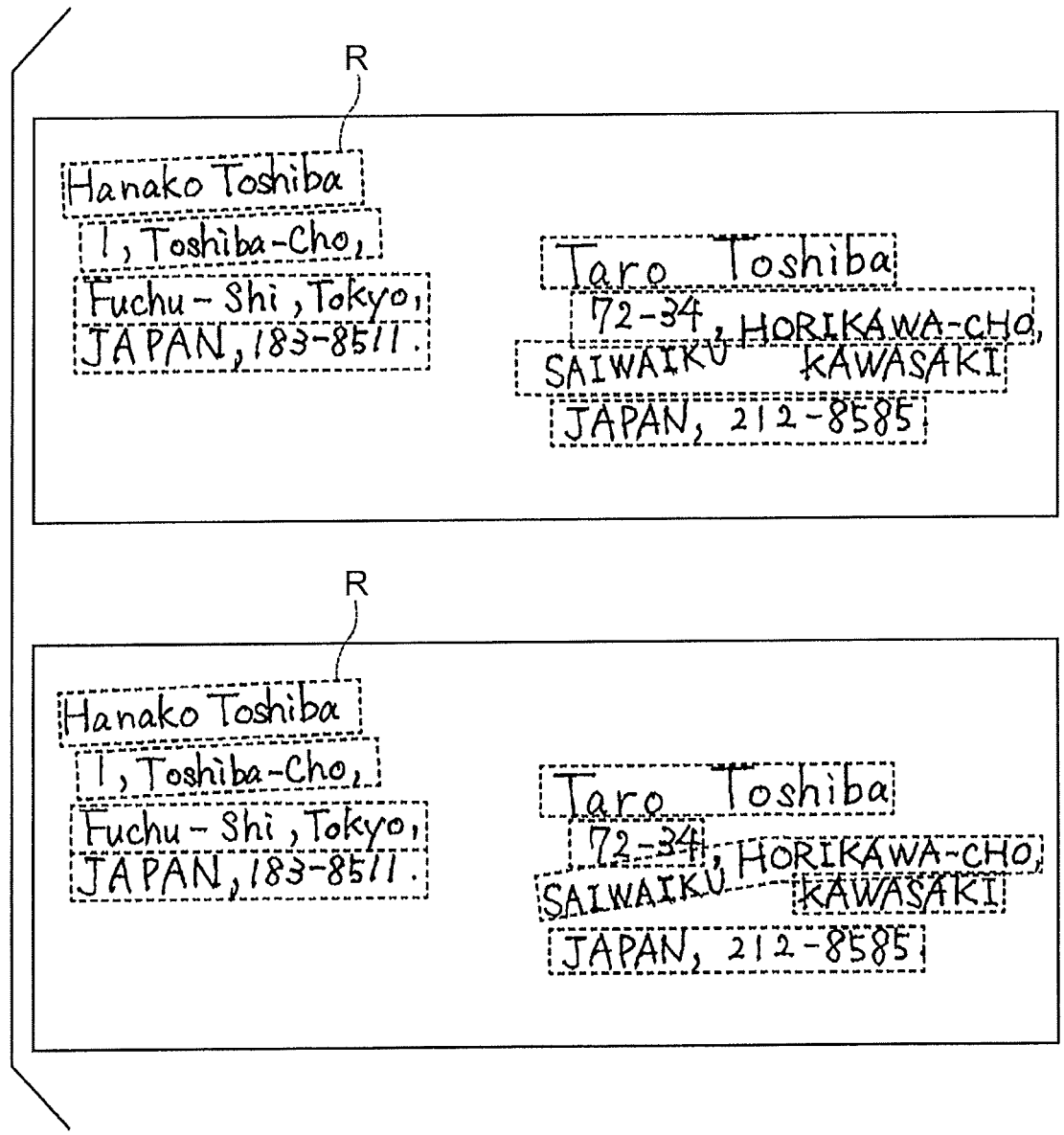
FIG. 10 is a diagram showing an aspect in which a plurality of candidates are extracted in the result of the processing by the line extraction portion 25A.

The correct solution derivation portion 130 derives a correct solution based on the keying information 166, with respect to the recognition result by the recognition execution portion 120. As described above, there is a case in which, in the recognition result by the recognition execution portion 120 (=the recognition result by the OCR processing portion 25), a plurality of candidates may be extracted in the processing of each stage. FIG. 10 is a diagram showing an aspect in which a plurality of candidates are extracted in the result of the processing by the line extraction portion 25, as an example. An upper diagram of FIG. 10 shows the same as the result of the processing shown in FIG. 4. A lower diagram of FIG. 10 shows the result of the processing that is different from that of the upper diagram. As shown in the drawing, a case in which "72-34, HORIKAWA-CHO" is extracted as one line, and a case in which "SAIWAIKU, HORIKAWA-CHO" is extracted as one line may be thought of. In such a case, the recognition execution portion 120 (the OCR processing portion 25) does not necessarily select any one of them, but executes the processing of the later stage based on the both processing results, assuming that the both are potential. As a result of this, there may be a case in which the processing result by the recognition execution portion 120 (the OCR processing portion 25) indicates a tree-shaped branch structure from the processing result of the line extraction portion 25A that is the upstream side toward the processing result of the individual character recognition portion 25E that is the downstream side.

Figure 11:
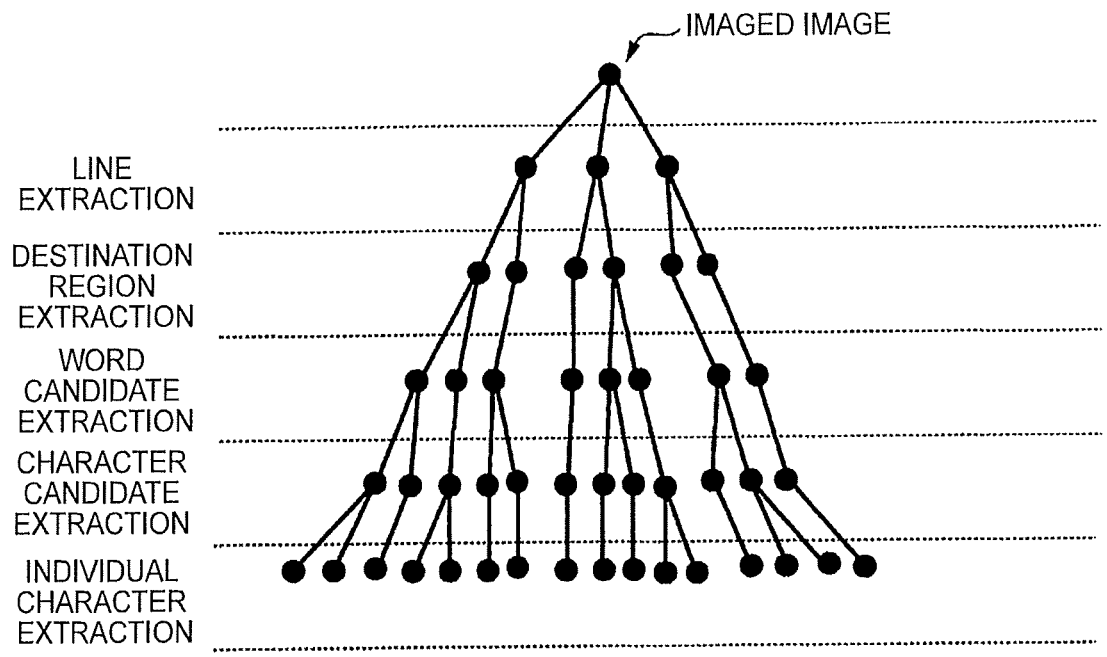
FIG. 11 is a diagram schematically showing a branch structure caused by fluctuation of the processing results of the respective stages by the recognition execution portion 120 (the OCR processing portion 25)

FIG. 11 is a diagram schematically showing a branch structure caused by fluctuation of the processing results of the respective stages by the recognition execution portion 120 (the OCR processing portion 25). When the processing results are separated in this manner, there may be a case in which the destination cannot be uniquely identified even if the DB matching is performed. For this reason, there has been a problem that it is difficult to give a correct solution for the processing of each stage, and thereby tuning in the processing of each stage is difficult. In addition, actually, a processing may be performed such that probabilities are assigned to branch destinations respectively, and the branch destinations with low probabilities are to be excluded.

Figure 12:
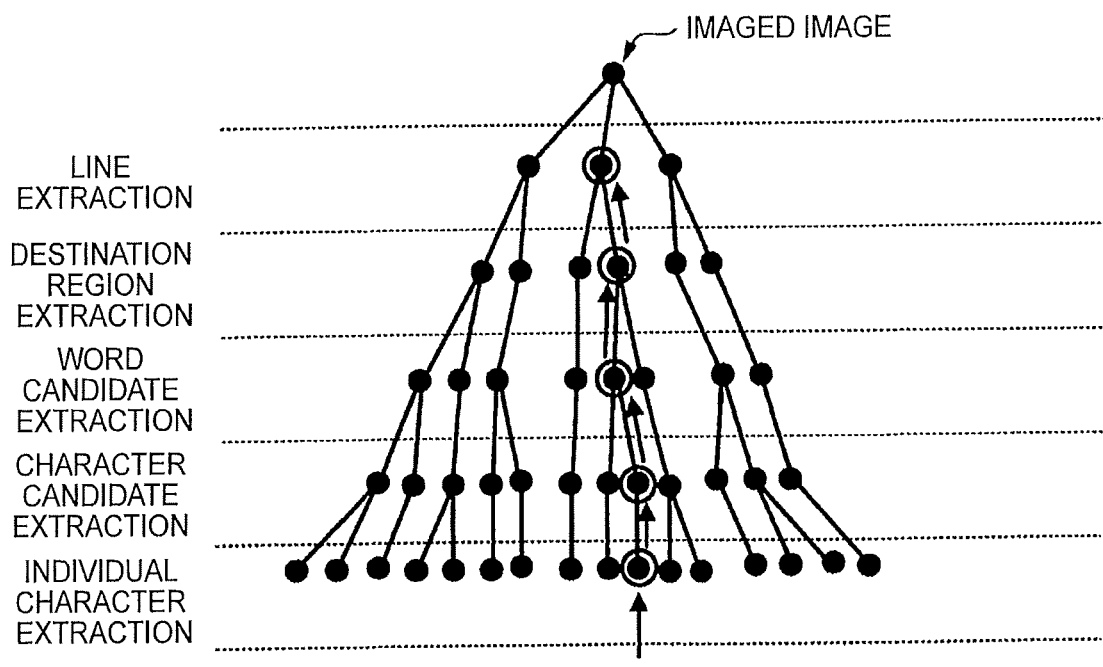
FIG. 12 is a diagram schematically showing an aspect in which the correct solution derivation portion 130 derives correct solutions of the respective stages.

In contrast, the correct solution derivation portion 130 derives a correct solution to the result of the individual character recognition from the keying information associated with each of the imaged images included in the imaged image 168, and derives a correct solution of the processing of each stage based on this. As described above, the keying information 166 is a postal code, for example. To begin with, the correct solution derivation portion 130 searches the address database 172 using the postal code, and identifies at least a part of the destination address. And the correct solution derivation portion 130 determines the processing result of the individual character recognition which best matches the identified destination address as a correct solution, and gives the results of the respective processings traced back from the correct solution to the upstream side of the tree structure to the machine learning portion 140 as correct solutions. That is, the correct solution derivation portion 130 derives the correct solutions in order from the downstream side regarding the flow of the processing. FIG. 12 is a diagram schematically showing an aspect in which the correct solution derivation portion 130 derives correct solutions of the respective stages.

FIG. 13 and FIG. 14 are diagrams each showing an aspect in which a processing result that is not a correct solution is obtained by fluctuation of the processing result of each stage by the recognition execution portion 120 (the OCR processing portion 25). When the word candidate W as shown in FIG. 13 is extracted, candidates of characters to be extracted by the character candidate extraction come to have a plurality of patterns expressed by paths as shown in the lower drawing of FIG. 13. For example, "TO" of "TOSHIBA" is not necessarily recognized as two characters correctly, but there is a possibility that "TO" is recognized as one character. In addition, "H" is not necessarily recognized as one character correctly, but there is also a possibility that "H" is recognized as two characters of "1" and "2".

When the result of the individual character recognition indicates a plurality of patterns in this manner, one result is selected based on the result of the DB matching. FIG. 14 shows words which can correspond to the result of the individual character recognition and respective scores thereof, in the word list included in the addresses stored in the address database 25G. Regarding the score, the higher the degree of coinciding with the result of the individual character recognition is, the higher the score becomes. As shown in the drawing, there is a possibility that a word of "TO5121134" that is not "TOSHIBA" of the correct solution is recognized as a correct solution. FIG. 15 is a diagram showing an aspect in which a wrong word is recognized as a correct solution. Since there is a possibility that the result of the final individual character recognition becomes an error, it is not easy to identify a correct solution in the processing of the more previous stage than it. This makes it difficult to adjust a processing at each stage of the OCR processing.

Figures 16, 17:
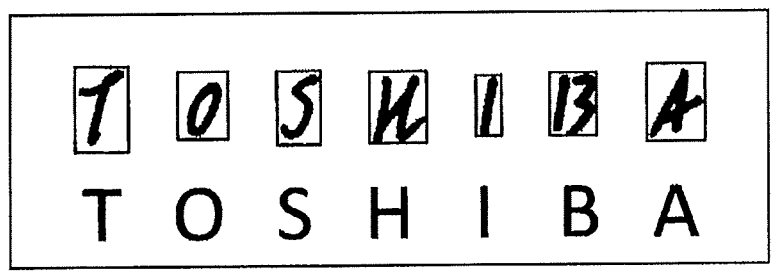
FIG. 16 is a diagram showing an aspect in which narrowing is performed by the keying information.
FIG. 17 is a diagram showing an aspect in which narrowing is performed by the keying information.

In contrast, FIG. 16 and FIG. 17 are diagrams each showing an aspect in which narrowing is performed by the keying information. As shown in FIG. 16, when the words corresponding to the individual recognition result are searched from the address database 25G, while the words to be searched are limited to the words corresponding to the keying information, it becomes possible to narrow down the candidates to a smaller number of candidates than the candidates of the words shown in FIG. 14 (there is a case capable of narrowing down the candidates to one). As a result of this, "TOSHIBA" that is a correct solution come to be selected, as shown in FIG. 17.

And, the machine learning portion 140, regarding the processing of each stage, inputs the processing result of the previous stage, performs machine learning using the correct solution derived by the correct solution derivation portion 130, and thereby derives an optimum parameter, procedure, rule and so on in the processing of each stage. The program obtained by applying the optimum parameter, procedure, rule and so on are applied to the recognition program 162 is the corrected recognition program 164.

It is suitable that the machine learning portion 140 performs machine learning by deep learning. The deep learning is a method for learning parameters between layers in a multilayer neural network. As the neural network, a CNN (Convolutional Neural Network), an RNN (Recurrent Neural Network), and so on are used. And, there may be a case in which an auto encoder for narrowing down an initial value is used. In addition, the machine learning portion 140 may perform machine learning by other methods, such as an SVM (Support Vector Machine), a logistic regression, and a Bayesian filter.

The optimum parameter, procedure, rule, and so on in the processing of each stage to be learned by the machine learning portion 140 are various, and include those which cannot be estimated by a human. For example, there may be a case in which a rule which seems to be meaningless apparently, such as "when color is totally reddish, an interval between individual characters tends to be large" is learned, but a lot of such rules are combined, and thereby there may be a possibility that a processing can be performed with a higher correct solution rate than a model that has been set by a human.

Figure 18:
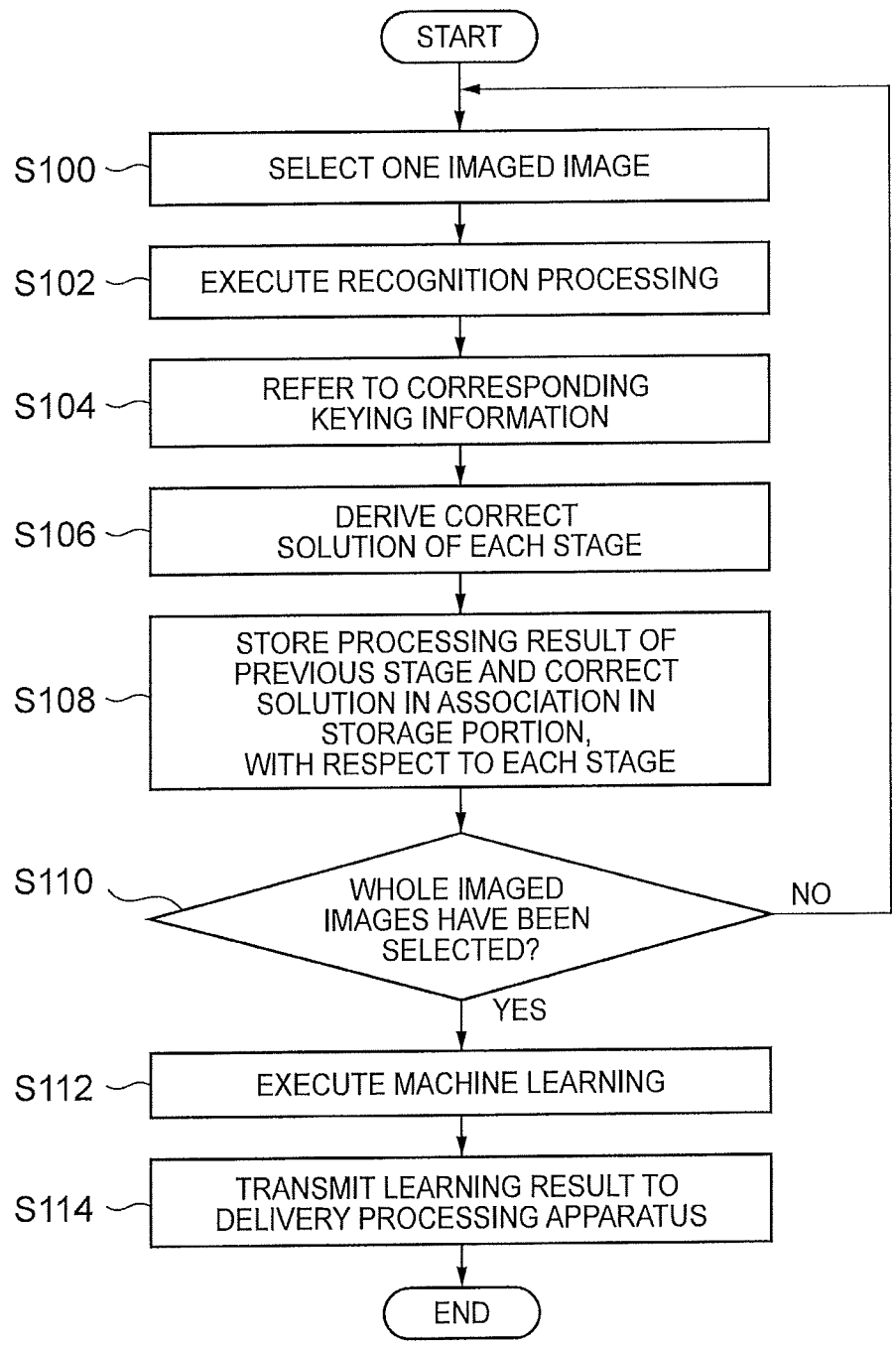
FIG. 18 is a flow chart showing an example of a flow of a processing to be executed by the recognition support apparatus 100.

FIG. 18 is a flow chart showing an example of a flow of a processing to be executed by the recognition support apparatus 100. To begin with, the information management portion 110 selects one of the imaged images from the imaged image 168 (step S100). Next, the recognition execution portion 120 executes a recognition processing by the same method as the OCR processing portion 25 (step S102).

Next, the correct solution derivation portion 130 refers to the keying information corresponding to the imaged image selected in S100 (step S104), and derives a correct solution in each stage of the recognition processing (step S106). The correct solution derivation portion 130 stores the processing result at the previous stage (if in an initial processing, an original image) and the correct solution in the storage portion 160 in association for each stage (step S108).

Next, the recognition support apparatus 100 determines whether or not the whole imaged images have been selected in S100 (step S110). When the whole imaged images have not been selected in S100, the processing is returned to S100.

When the whole imaged images have been selected in S100, the machine learning portion 140 performs the machine learning for the processing of each stage, and derives the optimum parameter, procedure, rule, and so on of the recognition program 162 (step S112). And the recognition support apparatus 100 transmits the learning result (for example, the corrected recognition program 164) to the delivery processing apparatus 10 (step S114).

According to at least one embodiment described above, a delivery processing apparatus 10 which performs an OCR processing including a plurality of processings for an image obtained by imaging a delivery object S, and conveys the delivery object S to a stacking portion (a stacker 40) corresponding to information read by the OCR processing, a video coding terminal (a VC terminal 90) which receives the image obtained by imaging the delivery object S from the delivery processing apparatus 10, displays the received image to an operator, and transmits keying information inputted by the operator to the delivery processing apparatus 10, and a recognition support apparatus 100 having an information management portion 110 which acquires the image obtained by imaging the delivery object S and the keying information, a correct solution derivation portion 130 which derives respective correct solutions for the plurality of processings for the image obtained by imaging the delivery object S, based on the keying information acquired by the information management portion 110, and a machine learning portion 140 which performs machine learning using the correct solutions for the plurality of processing derived by the correct solution derivation portion 130, to adjust the plurality of the processings are provided, and thereby the plurality of processings included in the OCR processing can be automatically adjusted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The above-described embodiment can be expressed as described below. A recognition support apparatus having an information management portion which acquires an image that is obtained by imaging a delivery object (S) in a delivery processing apparatus and becomes an object of an OCR processing including a plurality of processings, and keying information inputted by an operator who has visually recognized the image, and a correct solution derivation portion which derives respective correct solutions for the plurality of processings for the image obtained by imaging the delivery object (S) in order from a downstream side, based on the keying information acquired by the information management portion, with respect to a flow of the processing.

What is claimed is:

1. A sorting system comprising:
delivery processing circuitry which performs an Optical Character Recognition (OCR) processing including a plurality of processings for an image obtained by imaging a delivery object, and conveys the delivery object to a stacker corresponding to information read by the OCR processing;
a video coding terminal which receives the image obtained by imaging the delivery object from which a part of all of the information have not been read by the OCR processing from the delivery processing circuitry, displays the image received, and transmits typing information inputted by an operator to the image obtained by imaging the delivery object to the delivery processing circuitry; and
recognition support circuitry wherein the recognition support circuitry further comprising:
an information management circuit which acquires the image obtained by imaging the delivery object to which the typing information has been inputted, and the typing information,
a recognition execution circuit which performs a recognition processing by the same method as the OCR processing of the delivery processing circuitry, wherein the recognition processing of the recognition execution circuit includes a line extraction processing which extracts a line, a destination region extraction processing which extracts a region including a plurality of the lines as a destination region, a word candidate extraction processing which extracts word candidates from each of the lines included in the destination region, a character candidate extraction processing which extracts individual character candidates included in the word candidate extracted, and an individual character recognition processing which determines regarding each of the character candidates extracted, to which one of the characters or symbols that have been previously registered each character candidate corresponds, to thereby perform individual character recognition, the individual character recognition processing, the character candidate extraction processing, the word candidate extraction processing, the destination region extraction processing, and the line extraction processing being arranged in order toward a lower stream side from an upper stream side regarding a flow of the OCR processing,
a correct solution derivation circuit which derives respective correct solutions for the plurality of processings, in the order of the individual character recognition processing, the character candidate extraction processing, the word candidate extraction processing, the destination region extraction processing, and then the line extraction processing, based on the typing information acquired by the information management circuit,
a machine learning circuit which performs machine learning using the respective correct solutions derived by the correct solution derivation circuit, to adjust the plurality of processings,
and transmits a learning result to the delivery processing circuitry.

2. The sorting system according to claim 1, wherein:
the machine learning circuit performs the machine learning by deep learning.

3. A recognition support apparatus comprising:
an information management circuit which acquires (i) an image that is obtained by imaging a delivery object from which a part of all of information have not been read by an Optical Character Recognition (OCR) processing in delivery processing circuitry and becomes an object of the OCR processing including a plurality of processings, and typing information inputted by an operator to the image;
a recognition execution circuit which performs a recognition processing by the same method as the OCR processing of the delivery processing circuitry, wherein the recognition processing of the recognition execution circuit includes a line extraction processing which extracts a line, a destination region extraction processing which extracts a region including a plurality of the lines as a destination region, a word candidate extraction processing which extracts word candidates from each of the lines included in the destination region, a character candidate extraction processing which extracts individual character candidates included in the word candidate extracted, and an individual character recognition processing which determines, regarding each of the character candidates extracted, to which one of the characters or symbols that have been previously registered each character candidate corresponds, to thereby perform individual character recognition, the individual character recognition processing, the character candidate extraction processing, the word candidate extraction processing, the destination region extraction processing, and the line extraction processing being arranged in order toward a lower stream side from an upper stream side regarding a flow of the OCR processing;
a correct solution derivation circuit which derives respective correct solutions for the plurality of processings, in the order of the individual character recognition processing, the character candidate extraction processing, the word candidate extraction processing, the destination region extraction processing, and then the line extraction processing, based on the typing information acquired by the information management circuit; and
a machine learning circuit which performs machine learning using the respective correct solutions derived by the correct solution derivation circuit, to adjust the plurality of processings, and transmits a learning result to the delivery processing.

4. The recognition support apparatus according to claim 3, wherein:
the machine learning circuit performs the machine learning by deep learning.

5. A recognition support method which a computer performs comprising:
acquiring an image that is obtained by imaging a delivery object from which a part of all of information has not been read by an Optical Character Recognition (OCR) processing in delivery processing circuitry and becomes an object of the OCR processing including a plurality of processings, and typing information inputted by an operator to the image;

by the same method as the OCR processing of the delivery processing circuitry, performing a line extraction processing which extracts a line, a destination region extraction processing which extracts a region including a plurality of the lines as a destination region, a word candidate extraction processing which extracts word candidates from each of the lines included in the destination region, a character candidate extraction processing which extracts individual character candidates included in the word candidate extracted, and an individual character recognition processing which determines, regarding each of the character candidates extracted to which one of the characters or symbols that have been previously registered each character candidate corresponds, to thereby perform individual character recognition, in order from a downstream side regarding a flow of the OCR processing, that is in the order of the individual character recognition processing, the character candidate extraction processing, the word candidate extraction processing, the destination region extraction processing, the word candidate extraction processing, the destination region extraction processing, and then the line extraction processing;

deriving respective correct solutions for the plurality of processings, in the order of the individual character recognition processing, the character candidate extraction processing, the word candidate extraction processing, the destination region extraction processing, and then the line extraction processing, based on the typing information acquired; and performing machine learning using the respective derived correct solutions, to adjust the plurality of processings, and transmitting a learning result to the delivery processing circuitry.

6. A non-transitory computer readable medium storing computer readable instructions thereon that, when executed by a computer, causes the computer to perform a method comprising:

making a computer acquire an image that is obtained by imaging a delivery object from which a part of all of information has not been read by an Optical Character Recognition (OCR) processing in delivery processing circuitry and becomes an object of the OCR processing including a plurality of processings, and typing information inputted by an operator to the image;

by the same method as the OCR processing of the delivery processing circuitry, making the computer perform a line extraction processing which extracts a line, a destination region extraction processing which extracts a region including a plurality of the lines as a destination region, a word candidate extraction processing which extracts word candidates from each of the lines included in the destination region, a character candidate extraction processing which extracts individual character candidates included in the word candidate extracted, and an individual character recognition processing which determines, regarding each of the character candidates extracted, to which one of the characters or symbols that have been previously registered each character candidate corresponds, to thereby perform individual character recognition, in order from a downstream side regarding a flow of the OCR processing, that is in the order of the individual character recognition processing, the character candidate extraction processing, the word candidate extraction processing, the destination region extraction processing, and then the line extraction processing;

making the computer derive respective correct solutions for the plurality of processings, in the order of the individual character recognition processing, the character candidate extraction processing, the word candidate extraction processing, the destination region extraction processing, and then the line extraction processing, based on the typing information acquired; and making the computer perform machine learning using the respective derived correct solutions, to adjust the plurality of processings, and transmit a learning result to the delivery processing circuitry.

* * * * *